United States Patent
Gebbeken et al.

(10) Patent No.: US 10,575,455 B2
(45) Date of Patent: Mar. 3, 2020

(54) PRESS WHEEL FOR AN AGRICULTURAL SOWING MACHINE

(71) Applicant: LEMKEN GMBH & Co KG, Alpen (DE)

(72) Inventors: Martin Gebbeken, Alpen (DE); Dennis Bergerfurth, Rees (DE); Mark Berendsen, Lengel (NL); Marcel Geraats, Nettetal (DE); Christian Gotzen, Viersen (DE); Thomas Lukas, Ahaus-Wullen (DE); Christian Paessens, Issum (DE); Dieter Werries, Alpen (DE); Andreas Van Kann, Dahlem (DE); Clemens Diepers, Aldekerk (DE)

(73) Assignee: LEMKEN GMBH & Co KG (DE)

( * ) Notice: Subject to any disclaimer, the term of this patent is extended or adjusted under 35 U.S.C. 154(b) by 0 days.

(21) Appl. No.: 15/772,261

(22) PCT Filed: Oct. 27, 2016

(86) PCT No.: PCT/DE2016/100506
§ 371 (c)(1),
(2) Date: Apr. 30, 2018

(87) PCT Pub. No.: WO2017/071692
PCT Pub. Date: May 4, 2017

(65) Prior Publication Data
US 2018/0317376 A1    Nov. 8, 2018

(30) Foreign Application Priority Data
Oct. 30, 2015 (DE) .................. 10 2015 118 640

(51) Int. Cl.
*A01C 5/06* (2006.01)
*F16C 19/06* (2006.01)
*A01B 29/06* (2006.01)

(52) U.S. Cl.
CPC .............. *A01C 5/068* (2013.01); *A01C 5/064* (2013.01); *F16C 19/06* (2013.01); *A01B 29/06* (2013.01)

(58) Field of Classification Search
CPC .......... A01B 29/00; A01B 29/06; A01C 5/068
USPC .................................. 172/519, 538, 578, 604
See application file for complete search history.

(56) References Cited

U.S. PATENT DOCUMENTS

| 4,141,302 A | 2/1979 | Morrison, Jr. |
| 4,153,303 A | 5/1979 | Tanner |
| 4,570,554 A | 2/1986 | Clark |
| 5,725,284 A | 3/1998 | Boyer |
| 5,896,932 A * | 4/1999 | Bruns .................... A01C 5/068 172/556 |

(Continued)

FOREIGN PATENT DOCUMENTS

| DE | 7817787 U1 | 12/1978 |
| DE | 3201994 A1 | 9/1982 |

(Continued)

*Primary Examiner* — Gary S Hartmann
(74) *Attorney, Agent, or Firm* — The Watson IP Group, PLC; Jovan N. Jovanovic

(57) ABSTRACT

A press wheel comprises an outer, circular tyre element, for an agricultural sowing machine, wherein ribs enclosed by an elastic filler material ensure improved radial and lateral guidance and suspension for the press wheel.

9 Claims, 3 Drawing Sheets

(56) References Cited

U.S. PATENT DOCUMENTS

| | | | | |
|---|---|---|---|---|
| 5,924,705 | A * | 7/1999 | Kubelka | A63C 17/22 |
| | | | | 280/11.19 |
| 6,082,276 | A * | 7/2000 | Klein | A01C 5/064 |
| | | | | 111/164 |
| 6,142,203 | A | 11/2000 | Bickford | |
| 6,655,747 | B2 * | 12/2003 | Young | A63C 17/223 |
| | | | | 301/5.301 |
| 8,544,516 | B2 * | 10/2013 | Mariman | A01C 7/203 |
| | | | | 152/500 |
| 9,137,941 | B2 * | 9/2015 | Stark | A01C 5/068 |
| 9,162,527 | B1 * | 10/2015 | Harrelson | B60B 33/0028 |
| 9,258,940 | B2 | 2/2016 | McCloskey | |
| 2010/0107946 | A1 | 5/2010 | Cooney | |
| 2016/0128266 | A1 * | 5/2016 | Phely | A01C 5/068 |
| | | | | 172/556 |

FOREIGN PATENT DOCUMENTS

| | | |
|---|---|---|
| DE | 102012108006 A1 | 5/2014 |
| DE | 102013111355 A1 | 4/2015 |
| EP | 0404241 A1 | 6/1990 |
| EP | 1461988 B1 | 4/2012 |
| RU | 155063 U1 | 9/2015 |
| WO | 2011119095 A1 | 9/2011 |

* cited by examiner

PRESS WHEEL FOR AN AGRICULTURAL SOWING MACHINE

BACKGROUND OF THE DISCLOSURE

The invention relates to an agricultural sowing machine with a press wheel for the precise application of seeds.

A single grain sowing machine is known from U.S. Pat. No. 4,141,302 A, in which seed is deposited at defined distances in a furrow opened by a double disc coulter. In order to prevent a rolling about of the seed within the furrows, the seed is pressed with a press wheel into the bottom of the furrow. A similar device is presented in the German application DE 10 2013 111 355, however, with two double disc coulters placed at an angle to each other with intermediate depth guide rollers, wherein press wheels are also assigned to the respective double disc coulters, which immediately after the seed discharge press the seed grains into the bottom of the furrow. In order to prevent a caking or blocking of the press wheels in the furrow in difficult, sticky soil conditions, the European patent application EP 404 241 A1 proposes a press wheel driven at approximately the travelling speed of the sowing machine, which prevents a displacement of the seed grains within the furrows. A further form of a press wheel is described in the European patent EP 1461 988 B1, wherein an elastic, rectangular hollow tire fills the U-shaped furrow cross section of a coulter shoe behind a double disc coulter and projects beyond its lower edge and the seed grains pressed. Via a claimed length-width ratio of at least 2:1, preferably 3:1, a self-cleaning flexing effect of the hollow tire is to be achieved. A rigid rim body with a clamping groove for the tire is thereby guided nearly up to the hollow body of the tire. In particular, when the sowing machine is inserted into the soil, in the case of a non-rectangular furrow execution and in the case of cornering this leads to unwanted deformation of the hollow tire, whereby the latter cannot be guided cleanly over the deposited seed grains or even emerge from the furrow cross section. The applicant itself speaks of a flabby execution. In the later publication DE 10 2012 108 006 A1 of the same applicant the roller is supposed to be folded up or removed in the case of wet and sticky soil conditions.

SUMMARY OF THE DISCLOSURE

The problem addressed by the invention is to provide a seed press wheel, which has a smaller tire or press cross section, which, however, is designed to be laterally and/or radially elastically resilient, wherein through the elasticity of the press wheel improved guidance and self-cleaning properties are ensured. The press wheel is thereby supposed to be durable, cost-effective and preferably can be produced off-tool.

By the arrangement of one or several rib elements, which extend radially and partially or circumferentially between outer tire element and the rim, wherein the remaining free spaces between tire element, hub and rib elements are filled with a filling material made from an elastic or resilient material, the tire element, the hub or rim and the rib elements are positively or materially connected with one another, whereby an elastic deformation between tire element and hub laterally and/or radially to the running axis of the press wheel is ensured. Preferably, the filling material forms the sole connection between tire, hub and/or rib elements. By skillful selection of the filling material materialas well as by design of the rib elements a substantially improved guidance of the press wheel within the seed furrow is achieved. In addition to the self-cleaning flexing effect, which is produced through the lateral and/or radial deformation of the elastic filling material, directly on the furrow ground by forming the tire with at least one elastic hollow bodyone achieves a flattening of the tire on its contact surface in the furrow, which ensures a reliable braking of the deposited grains and a uniform pressing of the same.

If one forms the tire within the furrow area as a circumferential hollow chamber body, an improved deformation- and flexing effect is achieved underneath the furrow upper edge, without jeopardizing the entire lateral stability of the tire. A height-/width ratio of the tire cross section of approximately 1:1 or less, therefore wider than high, can thereby be aimed at.

If one forms the tire material with a material of a different elasticity than was selected for the filling body, then the respective deformation areas of the tire or of the filling material can be skillfully arranged and defined, without being unnecessarily restricted in the shape of the press wheel.

Preferably the rib is formed either with the tire or with the hub in a positive or material manner and from in each case one of the materials, namely that of the rim or the tire. In order to design the connection between rib element and filling body or tire or hub in a durable manner, the rib and/or the filling body have break-outs or elevations, which are distributed uniformly on their respective circumferential surface and provide for a further positive connection between rib, the finished filling body and rim or tire.

For an economical and cost-effective series production it is advisable to produce the filling body arranged between tire and/or hub in a primary shaping method such as pressing, vulcanizing or a casting process. For example, the tire is inserted with rib element, if applicable, also the hub, into a tool mold and recast, reshaped or repressed with the filling material.

In order to prevent an adhesion of in particular wet soil material to the press wheel, the filling body in particular at its transition to the tire has a continuous and/or smooth shape of its lateral flanks or surfaces. The flank width thereby approximately corresponds to the width of the tire element. In order to achieve in a single grain sowing machine a precise seed placement and a rolling about of the seed grain even at high travel or impact velocities, the press wheel is arranged as much as possible directly behind the seed outlet, which is arranged upstream of a furrow opener, preferably a double disc coulter.

A press wheel can be produced cost-effectively in mass production in an injection molding-, foaming-, vulcanizing-, bonding- or press process. Several process steps are thereby successively used in several tool components or in an entire tool. Assembly steps can also be formatively replaced or automated.

The invention is characterized in particular in that a tire element of a press wheel, preferably a hollow tire, is stabilized between hub and tire by rib elements, wherein by filling up the intermediate spaces with an elastic or resilient filling body an improved radial and/or lateral guidance and self-cleaning of the press wheel are achieved.

Further details and advantages of the subject matter of the invention result from the following description and the associated drawings, in which an embodiment is depicted with the details and individual parts necessary for this purpose.

DETAILED DESCRIPTION OF THE DISCLOSURE

Figure Description

Figure 1:
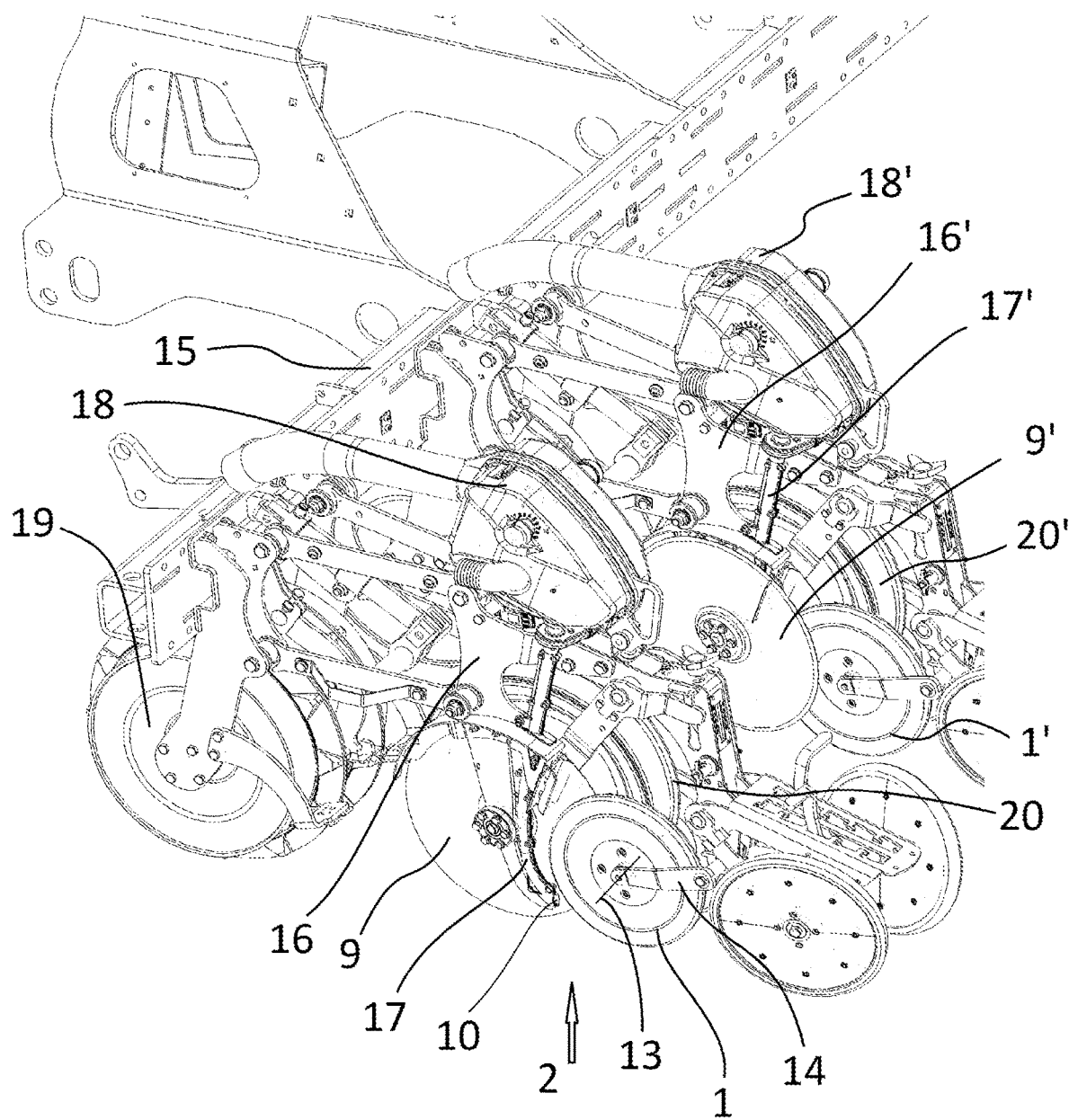
FIG. 1 shows a structure of an agricultural sowing machine in a perspective view obliquely from behind.

FIG. 1 shows the basic structure of an agricultural sowing machine 2, here an agricultural single grain sowing machine. A frame 15 is used for attachment to a vehicle, which moves the sowing machine 2 over the soil. Alongside one another two of several sowing units 16, 16' are depicted, which in each case run in advance of a profiled support roller for shaping a double seed groove. In the area of the support roller fertilizer coulters (not depicted) for applying fertilizer can be arranged between the two seed grooves as well as further broaching tools. In alignment with the respective seed grooves a furrow opener 9 designed as a double disc coulter follows, which cuts or forms a seed furrow designed as a V-, U- or W-cross section for placing seed grains in the seed groves pre-compacted by the support roller. Between in each case two furrow openers 9 of a sowing unit 16 a further, height-adjustable depth guide roller 20 is integrated for depth guidance of two adjacent, vertically movable suspended furrow openers 9. Above the respective sowing unit 16, 16' a dosing unit 18 is arranged for the alternating delivery of individual seed grains into a right and a left line 17. The right line is hidden by the depth guide roller 20, the left line 17 is, however, clearly visible by omitting a disc of the double disc counter/furrow opener 9. The outlet opening 10 of the line 17 opens into the furrow wrought by the furrow opener 9 immediately in front of the press wheel 1, which catches the seed grains emerging from the outlet opening 10 and presses them into the bottom of the furrow. The press wheel 1 is rotatably mounted via an axis 13 and with a pivotable lever 14 is height adjustable relative to the sowing unit 16 and can be subjected to a further pressing force by an energy storage means. Further rollers or tools follow for closing the furrows and covering the seed with soil material.

Figure 2:
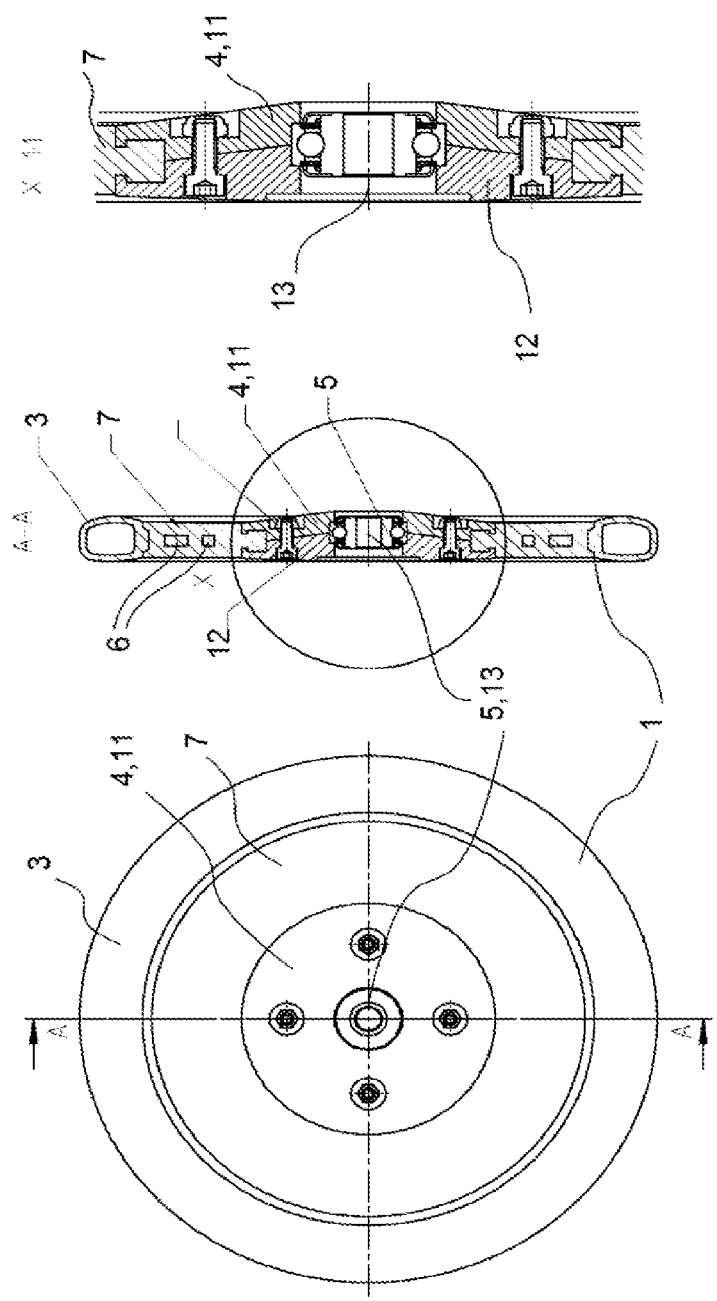
FIG. 2 shows a side view as well as a sectional image of the press wheel and FIG. 3 shows a perspective depiction of the press wheel while exempting the filling material in order to gain a better understanding.

FIG. 2 shows the actual assembly of the press wheel 1. The axis of coordinates describes the position of the axis 13, about which the hub 5 freely rotates by means of a bearing 5. The bearing 5 is held in position within the hub 4 by two hub halves 11, 12, which are fixed with fastening means such as, for example, depicted screws, nuts or rivets. A circumferential hollow chamber profile, which is adjusted in its form to a furrow cross section or its lateral flanks and which limits the outer diameter of the press wheel 1, constitutes the tire or the tire element 4. The tire 4 is made from an elastomer such as rubber or polyurethane, advantageously in an elasticity or hardness of 50-60 degrees Shore. The hollow chamber can be designed unpressurized (semi-pneumatic) or pressure-tight or filled with a preferably soft filling foam. The tire 4 or its cross section can also be designed as a solid profile, for example, from stainless steel, a plastic such as polyamide, but also one of the aforementioned elastomers. In the case of a solid profile the profile height is preferably smaller than the width of the tire profile cross section or of the press wheel.

Figure 3:
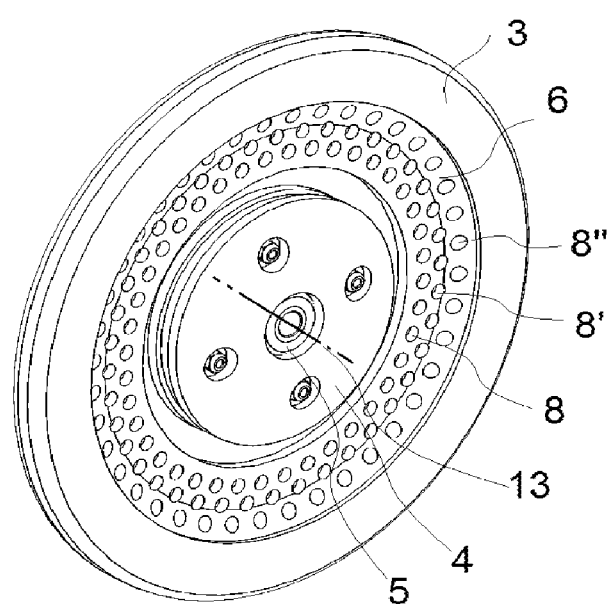

Both the hollow profile or the solid profile of the tire 4 can be provided on its outer running surface with a tire profile with grooves and/or elevations to support the ground drive of the press wheel in the furrow or for improving the seed grain capture or self-cleaning properties. The inner diameter limiting the profile of the tire 3 continues in a rib element 6 which circulates concentrically with respect to the axis 13 and which extends inside the press wheel 1. The rib element 6 is preferably made together with the tire 3 and from the same material. For this purpose, a rib division is provided via an upright tire- or tool separation plane into two rib halves continuing from the tire flanks, which are flat relative to one another and limit the tire hollow chamber inwards. Uniformly about the axis 13 the rib element 6 is arranged interrupted by break-outs or breakthroughs 8, such as boreholes, elongated holes, oval or kidney-shaped forms, preferably tapered concentrically inwards. By the width and height of the rib elements 6 as well as by the number and design of the break-outs, a wide variety of lateral and radial guidance and suspension properties of thepress wheel can be generated in interaction with the elastic filling body 7, which fills the remaining residual contour of the press wheel between tire 3 and hub 4. In the case of a rather narrow width of the rib element 6 the filling body is to be selected with a greater Shore hardness than that of the tire material, preferably between 60 and 80 degrees Shore. If the rib elements are provided in a rather bulky manner with smaller or fewer recesses, the shore hardness of the filling material must be selected lower than that of the tire material, approximately between 20 and 50 degrees Shore. In contrast to a pure elastomeric filler, which could be cast between tire and hub, a positive locking between tire, hub and/or rib element is achieved through the breakthroughs in the rib element, which effectively and easily prevents a premature detachment of the aforementioned components or their body from one another. The respective hub halves 11, 12 are provided in the outer area with circumferential grooves, which fix the correspondingly formed filling body material or rib element partially extending thereto laterally and concentrically about the axis 13. For a better understanding in FIG. 3 the tire 3 is depicted with a shaped, circumferential rib 6 and its breakthroughs 8, 8', 8" arranged regularly on concentric circles, which breakthroughs would otherwise be hidden by the filling material. The tire 3 with rib 6 is inserted with or without hub, depending on one-piece or multiple piece design, in a sealing manner into an injection-, casting, pressing- or foaming tool simulating the outer contour of the filling body 7 and is completed by the cross-linking or vulcanizing filling material filling up and enclosing the recesses 8, 8', 8" and the rib.

Three pages with drawings follow.

LIST OF REFERENCE SIGNS

| | |
|---|---|
| 1 | press wheel |
| 2 | agricultural sowing machine |
| 3 | tire, tire element |
| 4 | hub |
| 5 | bearing, roller- or ball bearing |
| 6 | rib element |
| 7 | filling material |
| 8 | break-out, breakthrough |
| 9 | furrow opener |
| 10 | outlet, outlet opening |
| 11 | hub half |
| 12 | hub half |
| 13 | axis |
| 14 | lever |
| 15 | frame |
| 16 | sowing unit |

| | |
|---|---|
| 17 | line |
| 18 | dosing unit |
| 19 | support roller |
| 20 | depth guide roller |

The invention claimed is:

1. A press wheel for an agricultural sowing machine, comprising:

an outer, circular tire and inner hub for receiving a roller bearing, wherein the diameter of the tire is a multiple of a width of the tire, wherein at least one rib element extends between tire and hub for the guidance and stabilization of the tire, wherein the rib element is enclosed by a filling body of an elastic or resilient material and forms the connection between the tire and the hub, wherein the filling body is a positive or material connection in an area between at least one of a combination of the hub and the rib element and a combination of the rib element and the tire;

wherein the rib element is connected to one of the fire and the hub, in a positive or material manner;

wherein the rib element has several break-outs distributed across a circumferential surface area of the rib element, the circumferential surface area constituting a positive connection between the rib element and the filling body; and wherein a filling material forms a sole connection between the hub and the rib elements with the tire.

2. The press wheel according to claim 1, wherein the tire also comprises an elastic material and has at least one, circumferential hollow chamber.

3. The press wheel according to claim 1, wherein a material of the tire has a different elasticity than a material of the filling body.

4. The press wheel according to claim 1, wherein the rib element and the tire consist of the same material.

5. The press wheel according to claim 1, wherein the filling body has a plurality of break-outs distributed across a circumferential surface area of the filling body, the circumferential surface area constituting a positive connection between the rib element and the filling body.

6. The press wheel according to claim 1, wherein the rib element between the tire and the hub is enclosed by the filling body.

7. The press wheel according to claim 1, wherein the filling body has at least one of a continuous and smooth shaping of lateral flanks of the filling body.

8. The press wheel according to claim 1, further comprising a furrow opener and an outlet for delivery of seeds, the furrow opener and the outlet being disposed upstream of the press wheel.

9. An agricultural sowing machine including the press wheel according to claim 1.

* * * * *